Patented May 15, 1928.

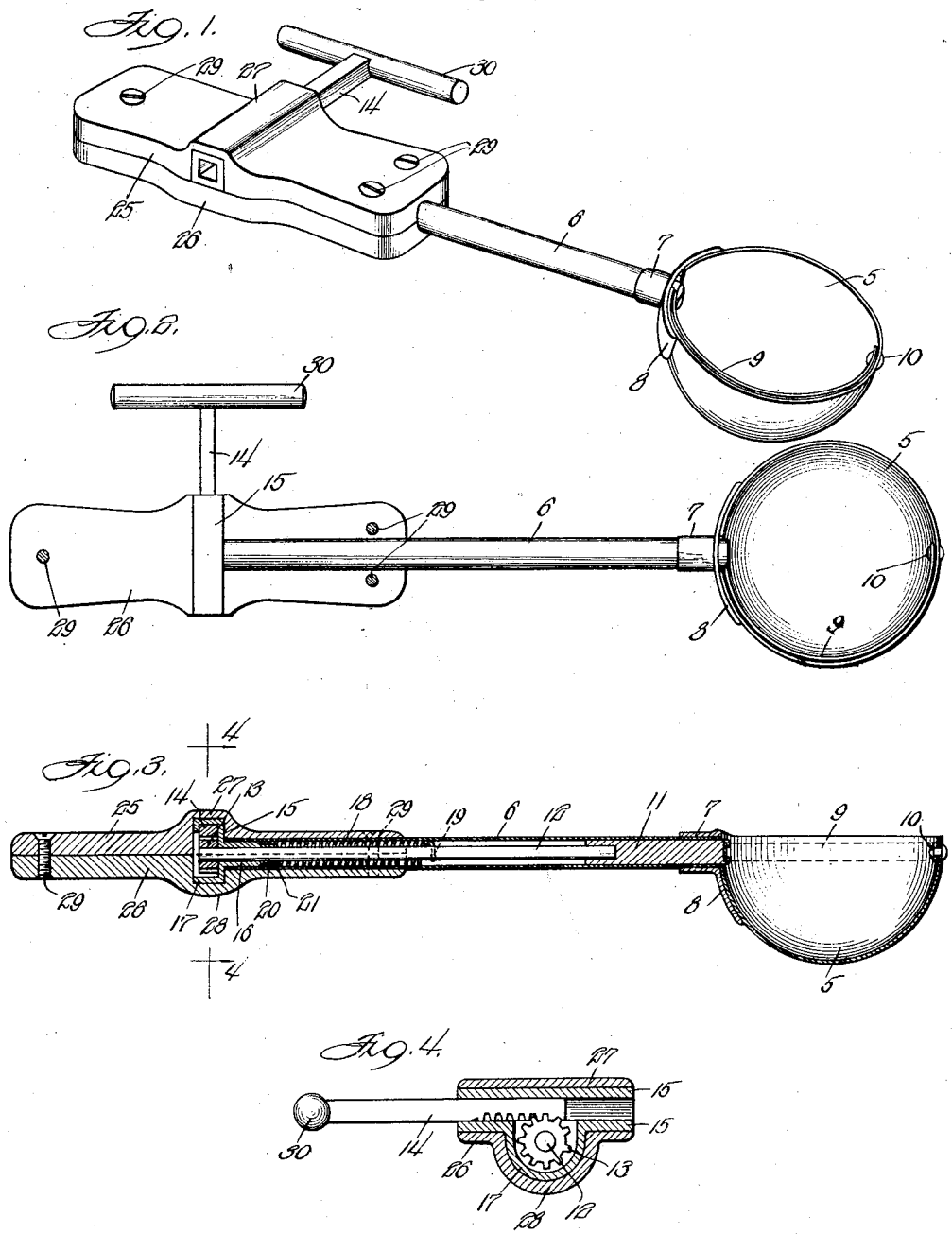

1,669,703

UNITED STATES PATENT OFFICE.

HARRISON D. FLEGEL, OF RACINE, WISCONSIN, ASSIGNOR TO ARNOLD ELECTRIC COMPANY, OF RACINE, WISCONSIN, A CORPORATION OF WISCONSIN.

ICE-CREAM DISHER.

Application filed August 22, 1925. Serial No. 51,741.

This invention relates to ice cream dishers.

One of the objects of the invention is to provide an improved ice cream disher.

Another object is to provide a disher which is simple, compact, reliable and rugged.

Another object is to provide a disher with few exposed moving parts.

Another object is to provide a disher having few pivotal connections.

Other objects and advantages will hereinafter appear.

An embodiment of the invention is illustrated in the accompanying drawing wherein, Fig. 1 is a perspective view of the complete disher;

Fig. 2 is a top plan thereof with one grip section removed;

Fig. 3 is a longitudinally vertical section through the disher, and

Fig. 4 is an enlarged section on the line 4—4 of Fig. 3.

The ice cream disher chosen to illustrate one embodiment of the invention consists in general of two separable units. One unit which may be termed the operating unit includes a bowl and a movable scraper therefor, and the mechanism for moving the scraper in the bowl to free ice cream therefrom. The other unit comprises a hand grip whereby the operating unit may be held and manipulated by one hand of the operator.

The operating unit has a substantial hemispherical metal bowl 5 to one side of which is secured a tubular metal supporting handle section 6. The handle section 6 has a collar 7 secured thereto by suitable means such as solder, and the collar 7 has integrally formed therewith a bowl embracing flange 8. Flange 8 is curved to fit upon a portion of bowl 5 and is rigidly attached thereto by suitable means such as solder, rivets or spot welds. A thin metallic and preferably somewhat resilient scraper 9 is pivotally mounted within bowl 5 so that it may be moved forth and back over the inner surface thereof to loosen the ice cream therefrom. A rivet 10, passing through the outer end of scraper 9 and loosely through a hole in the bowl, serves as one pinion or trunnion for the scraper. The inner end of scraper 9 is anchored to an operating shaft section 11 which has a bearing fit within the outer end of handle section 6. The preferred manner of anchoring the scraper to the shaft section is to slot the end of section 11 and, after placing the scraper in the slot, to rivet over or upset upon the scraper the projections which lie on opposite sides of the slot as most clearly shown in Figure 3.

The driving or operating shaft of the scraper is completed by a rod 12 which is rigidly secured to the enlarged section 11 and which extends through and projects beyond the opposite end of handle section 6. A pinion 13 is rigidly secured to the projecting end of rod 12. A scraper operating handle in the form of a toothed rack bar 14 is adapted to engage pinion 13 so as to rotate the same. A rectangular housing 15 which extends substantially at right angles to handle section 6 and projects beyond each side thereof, has a latterly extending tubular boss 16 which fits within and is rigidly secured to handle section 6 by solder or other suitable means. This housing has a chambered lug 17 projecting therefrom to form a recess for pinion 13 and it encircles rack bar 14 so as to provide a slideway therefor and hold the rack teeth in mesh with the pinion teeth. A retractible spring 18 surrounds rod 12 and has one end 19 secured thereto. The other end 20 of spring 18 lies around and is secured to a reduced end 21 of boss 16. Consequently, when housing 15 is held stationary, the rotation of the scraper shaft in one direction will wind up the spring and thus condition it to return the scraper when its operating handle is released.

The bowl, the tubular handle section, the scraper with its shaft, retractible spring and pinion, the operating handle or rack bar and the pinion and rack bar housing constitute an operating unit to which the grip unit may be attached to form a complete disher.

The grip unit consists of two complementary sections 25 and 26 formed from suitable material such as wood or preferably cast aluminum. Section 25 is formed with a channeled boss 27 extending transversely thereof for accommodating the rectangular part of housing 15, while grip section 26 is provided with a recessed projection 28 for accommodating the curved pinion lug 17 of the pinion housing. Each grip section is provided with a substantial hemicylindrical longitudinally extending slot for the accommodation of handle section 6. When the two grip sections are placed about the tubular handle section and the pinion and rack bar housing, they are clamped together by screws 29. In order to facilitate the operation of the rack bar by the fingers of the hand holding the grip it may be provided with a suitable cross bar 30.

In service the operator may hold the grip in the hollow of his hand with the fingers of the same hand embracing the cross bar of the operating handle. In this condition the bowl may be inserted into the ice cream to take up its load. In order to remove the ice cream from the bowl the operator, by merely the act of closing his hand, forces the operating handle toward the grip thereby rotating the pinion scraper shaft and scraper and tensioning the retractible spring. When the operating shaft has been thus forced to the limit of its stroke and the scraper has traveled completely over the inner surface of the bowl, the operator opens his hand whereupon the retractible spring returns the moving parts to their normal position.

Having thus illustrated and described one embodiment of my invention, what I claim and desire to secure by Letters Patent of the United States is:

1. An ice cream disher comprising a supporting handle having a bowl at one end and a hand grip at the other end, a movable scraper for the bowl, a scraper operating mechanism normally projecting from one side only of said grip in the center portion thereof and adapted to be actuated by closing the fingers towards the palm, and means for communicating the movements of the operating handle to the scraper.

2. An ice cream disher comprising a bowl, a tubular handle section attached at one end to the bowl, a grip attached to the other end of the handle section, a movable scraper for the bowl, a scraper operating shaft extending through the handle section and into the grip, a pinion on the shaft in the grip, and a plunger movable back and forth in the grip substantially mid-way between its ends and co-operating with the pinion to actuate the shaft and scraper.

3. In an ice cream disher the combination of a bowl, a movable scraper for the bowl, a driving shaft for the scraper, a handle for the bowl comprising a hollow section through which the shaft extends and a grip, a pinion on the shaft in the grip, a plunger movable transversely to the shaft and through the grip between its ends, driving connections whereby movement of the plunger in one direction drives the shaft and scraper, and a torsion spring for returning the shaft, scraper and plunger.

4. In an ice cream disher the combination of a bowl, a hollow handle section attached to the bowl, a scraper for the bowl, an operating shaft attached to the scraper and extending through the handle section, a pinion on the shaft, a spring for driving the shaft and scraper in one direction and located in the handle section, a grip attached to the handle section housing the pinion, and a toothed operating plunger slidably mounted in the grip between its ends and co-operating with the pinion to drive the shaft and scraper in a direction opposite to the spring drive.

5. An ice cream disher comprising a two sectioned grip, a hollow handle section anchored between the two grip sections, a shaft lying in the handle section and having a pinion located within the grip, a bowl attached to the handle section, a movable scraper in the bowl and attached to the shaft, a rack manually movable transversely through the grip near its central portion to drive the pinion, shaft and scraper in one direction, and a torsion spring to drive the rack, pinion, shaft and scraper in the reverse direction.

6. In an ice cream disher, a bowl, a scraper operatively mounted in said bowl, a handle supporting said bowl, a hand grip and means for actuating said scraper, including an actuating member carried by said grip between the ends thereof and transversely slidable relative to said handle.

7. An ice cream disher comprising a bowl, a tubular handle portion affixed to said bowl, a movable scraper within said bowl and a scraper operating shaft within said handle, a pinion mounted on said shaft, a two-part grip surrounding the end of said handle portion, one part of said grip being transversely grooved for the reception of a rack and the other part of said grip being formed with a substantially semi-circular recess for the reception of said pinion on the scraper operating shaft, a rectangular metal housing fitting within the recess in the first-named part of said grip and having a chambered lug depending therefrom for receiving said pinion, extending into the other part of the grip, a rack extending transversely through said grip within said housing and in mesh with said pinion, said rack being provided with means adapted to be grasped by the fingers in the operation of dishing ice cream, and a torsion spring surrounding said shaft for returning the shaft, scraper and rack to initial position after a dishing operation.

In witness whereof, I hereunto subscribe my name this 14th day of August, 1925.

HARRISON D. FLEGEL.